(12) United States Patent
Park et al.

(10) Patent No.: US 11,312,185 B2
(45) Date of Patent: Apr. 26, 2022

(54) TIRE WITH ENHANCED WET GRIP

(71) Applicant: Hankook Tire Co., Ltd., Seoul (KR)

(72) Inventors: Jae Gang Park, Daejeon (KR); Dong Uk Lee, Daejeon (KR); Ha Eun Koog, Seoul (KR)

(73) Assignee: Hankook Tire Co., Ltd., Seoul (KR)

( * ) Notice: Subject to any disclaimer, the term of this patent is extended or adjusted under 35 U.S.C. 154(b) by 119 days.

(21) Appl. No.: 16/208,342

(22) Filed: Dec. 3, 2018

(65) Prior Publication Data
US 2019/0329598 A1 Oct. 31, 2019

(51) Int. Cl.
B60C 11/12 (2006.01)
B60C 11/03 (2006.01)
B60C 13/02 (2006.01)

(52) U.S. Cl.
CPC ....... *B60C 11/0323* (2013.01); *B60C 11/0327* (2013.01); *B60C 11/12* (2013.01); *B60C 13/02* (2013.01); *B60C 2011/0337* (2013.01)

(58) Field of Classification Search
CPC .. B60C 11/12; B60C 11/1281; B60C 11/1204
See application file for complete search history.

(56) References Cited

U.S. PATENT DOCUMENTS

| 6,116,310 A * | 9/2000 | Shinohara | B60C 11/13 152/902 |
| 2012/0234443 A1* | 9/2012 | Kurokawa | B60C 11/1281 152/209.18 |
| 2017/0050472 A1* | 2/2017 | Matsuyama | B60C 11/0304 |
| 2017/0166015 A1* | 6/2017 | Christen | B60C 11/1281 |
| 2019/0241022 A1* | 8/2019 | Ishigaki | B60C 11/1218 |

FOREIGN PATENT DOCUMENTS

| JP | 2310108 | * 12/1990 | |
| JP | 07276923 A | * 10/1995 | ......... B60C 11/1281 |
| JP | 8238911 | * 9/1996 | ............. B60C 11/12 |
| JP | 2754040 B2 | 5/1998 | |
| JP | 2014-509980 A | 4/2014 | |
| KR | 10-1037410 B1 | 5/2011 | |
| KR | 101037410 B1 * | 5/2011 | ......... B60C 11/1218 |
| KR | 101411093 B1 * | 7/2014 | |
| KR | 10-1411093 B1 | 7/2017 | |

* cited by examiner

*Primary Examiner* — Cedrick S Williams
(74) *Attorney, Agent, or Firm* — Novick, Kim & Lee, PLLC; Jae Youn Kim; Jihun Kim

(57) ABSTRACT

Provided is a tire capable of efficiently discharging water, which is additionally absorbed through a plurality of flow tubes, through the flow tubes and a drain tube, thereby improving wet grip performance. The tire with enhanced wet grip includes a kerf formed on a block to discharge water introduced thereinto to a groove, a drain tube formed in the kerf in its longitudinal direction and connected to the groove to discharge the water to the groove, and a flow tube formed in the kerf toward the drain tube from an inlet of the kerf, into which the water is introduced, and connected to the groove or the drain tube.

6 Claims, 3 Drawing Sheets

TIRE WITH ENHANCED WET GRIP

CROSS-REFERENCE TO RELATED APPLICATION

Pursuant to 35 U.S.C. § 119(a), this application claims the benefit of earlier filing date and right of priority to Korean patent application No. 10-2018-0048517 filed on Apr. 26, 2018, the entire disclosures of which are hereby incorporated by reference.

BACKGROUND OF THE INVENTION

Field of the Invention

The present invention relates to a tire with enhanced wet grip, and more particularly, to a tire capable of efficiently discharging water, which is additionally absorbed through a plurality of flow tubes, through the flow tubes and a drain tube, thereby improving wet grip performance.

Description of the Related Art

In a pneumatic tire, a tread has a plurality of longitudinal grooves formed in the circumferential direction thereof and a plurality of transverse grooves formed in the widthwise direction thereof, and a plurality of tread blocks are formed by the longitudinal and transverse grooves. In addition, the tread blocks are formed with small grooves referred to as kerfs to adjust the stiffness of each tread block. The design of these kerfs is very important because the design, installation position, or number of kerfs is closely connected with tire performance such as noise and ride comfort.

Among the important performances of the tire, braking and handling on the wet road surface are increasingly emphasized. The related art uses a method of applying a moisture inlet to a tread and absorbing moisture on the tread surface into the tread to improve the running performance of the tire on the wet road surface, or a method of applying a general kerf to the upper portion of the tire and enlarging the bottom of the kerf to remove moisture and snow to a groove.

Korean Patent No. 10-1037410 (entitled "Tread Kerf of Heavy-duty Tire") discloses a tire in which in a tread kerf of a heavy-duty tire configured such that its lower end has a larger capacity than the inlet of the kerf to enhance the braking and durability of the tire on the surface of water and ice using the kerf on a block, the lower end of the kerf connected to the inlet of the kerf through a corrugated connection hole is formed of a venturi meter-type flow tube, thereby rapidly increasing a flow of air and a drainage speed.

CITATION LIST

Patent Literature

Patent Literature 1: Korean Patent No. 10-1037410

SUMMARY OF THE INVENTION

The present invention has been made in view of the above-mentioned problem, and an object thereof is to form a kerf having a function of additionally absorbing and discharging water on the road surface during rolling motion of a tire.

The present invention is not limited to the above-mentioned object, and other objects of the present invention can be clearly understood by those skilled in the art to which the present invention pertains from the following description.

To accomplish the object described above, a tire in which a block and a groove are formed on a tread according to an aspect of the present invention includes a kerf formed on the block to discharge water introduced thereinto to the groove, a drain tube formed in the kerf in its longitudinal direction and connected to the groove to discharge the water to the groove, and a flow tube formed in the kerf toward the drain tube from an inlet of the kerf, into which the water is introduced, and connected to the groove or the drain tube, thereby improving wet grip performance by changing the shape of the kerf.

In the aspect of the present invention, the drain tube may be formed between a lower end of the kerf and a half point of the depth of the kerf.

In the aspect of the present invention, the flow tube may have a slope of 0 to 90 degrees with respect to the drain tube.

In the aspect of the present invention, the flow tube may have a cross-sectional area that gradually decreases toward the drain tube from the inlet of the kerf.

In the aspect of the present invention, the flow tube may have a cross-sectional area that gradually increases toward the drain tube from the inlet of the kerf and then gradually decreases again.

In the aspect of the present invention, the flow tube may have a cross-sectional diameter of 1 to 4 mm.

In the aspect of the present invention, the drain tube may have a cross-sectional area that increases toward an outlet port of the drain tube from a center of the drain tube.

In the aspect of the present invention, the drain tube may have a cross-sectional diameter of 0.5 to 3 mm.

DETAILED DESCRIPTION OF THE PREFERRED EMBODIMENTS

Figure 1:
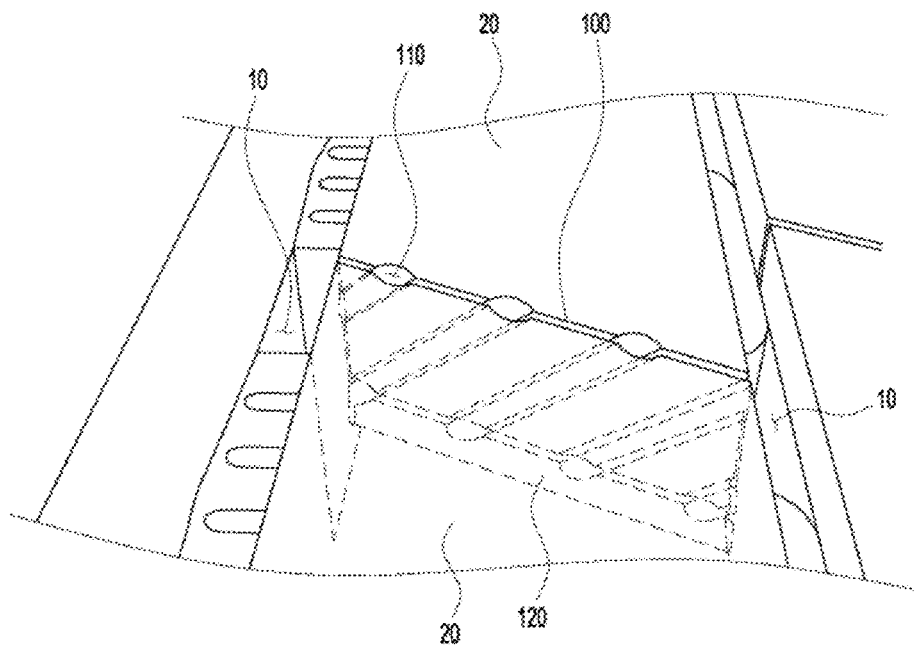
FIG. 1 is a perspective view schematically illustrating a main portion of a tire according to an embodiment of the present invention.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

Figure 2:
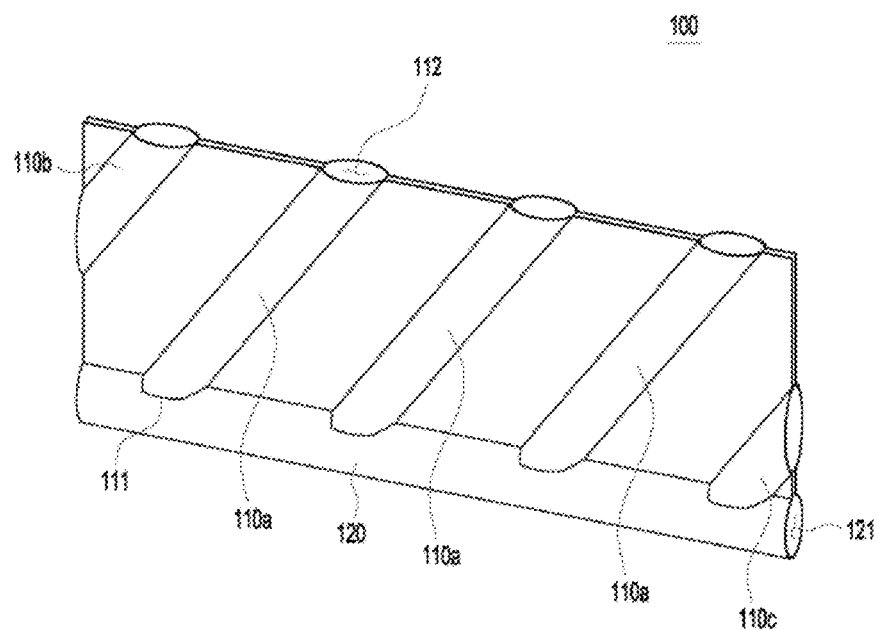
FIG. 2 is a schematic view illustrating a kerf according to the embodiment of the present invention.

FIG. 1 is a perspective view schematically illustrating a main portion of a tire according to an embodiment of the present invention. FIG. 2 is a schematic view illustrating a kerf 100 according to the embodiment of the present invention.

As illustrated in FIGS. 1 and 2, the tire with enhanced wet grip according to the embodiment of the present invention is a tire in which a block 20 and a groove 10 are formed on a tread, and includes a kerf 100 formed on the block 20 to discharge the water introduced thereinto to the groove 10, a drain tube 120 which is formed in the kerf 100 in the longitudinal direction thereof and which is connected to the groove 10 to discharge water to the groove 10, and a flow tube 110 which is formed in the kerf 100 toward the drain tube 120 from the inlet of the kerf 100, into which water is introduced, and which is connected to the groove 10 or the drain tube 120, thereby improving wet grip performance by changing the shape of the kerf 100.

Here, the groove 10 enables the water introduced into the groove 10 to be discharged to the outside of the tire by centrifugal force due to the rotation of the tire.

The longitudinal direction of the kerf 100 may be a longitudinal direction with respect to the shape of the kerf 100 identified on the surface of the tire.

The drain tube 120 may be formed between a lower end of the kerf 100 and a half point of the depth of the kerf 100.

The lower end of the kerf 100 may be a portion connected with an under tread in the kerf 100.

When the drain tube 120 is formed between the inlet of the kerf 100 and the half point of the depth of the kerf 100, an amount of water which may be introduced into an inlet port 112 of the flow tube is reduced due to a reduction in length of the flow tube 110, which may lead to a deterioration in water absorption of the tire.

As illustrated in FIG. 1, the kerf 100 may have a slope with respect to the circumferential (longitudinal) direction of the tire. Accordingly, as the length of the kerf 100 increases, the number of flow tubes or the volume of the flow tube 110 formed in the kerf 100 increases, thereby enabling an amount of water introduced into the kerf 100 to be increased.

When the kerf 100 has the slope with respect to the circumferential (longitudinal) direction of the tire as described above, the drain tube 120 may also have a slope with respect to the circumferential direction of the tire as illustrated in FIG. 1.

The slope of the flow tube 110 to the drain tube 120 may be 0 to 90 degrees.

In detail, the slope of the flow tube 110 may be an angle formed by the longitudinal center axis of the drain tube 120 and the longitudinal center axis of the flow tube 110.

If the slope of the flow tube 110 is 0 degrees, the flow tube 110 is formed in parallel with the drain tube 120. Accordingly, some of the water introduced into the inlet of the kerf 100 from the outside may flow along the flow tube 110 to be directly discharged to the groove 10, and the remaining water may flow to and along the drain tube 120 and then be discharged through an outlet port 121 of the drain tube to the groove 10.

Here, the outlet port 121 of the drain tube may be a connection portion between the drain tube 120 and the groove 10.

If the slope of the flow tube 110 is 90 degrees, the flow tube 110 is formed perpendicular to the drain tube 120. Accordingly, some of the water introduced into the inlet of the kerf 100 from the outside may flow along the flow tube 110 to be introduced to the drain tube 120, and the water introduced into the drain tube 120 may flow along the drain tube 120 and then be discharged through the outlet port 121 of the drain tube to the groove 10.

As illustrated in FIGS. 1 and 2, if the slope of the flow tube 110 ranges from more than 0 degrees to less than 90 degrees, the flow tube 110 may include a first flow tube 110a formed from the inlet of the kerf 100 to the drain tube 120, a second flow tube 110b formed from the inlet of the kerf 100 to the groove 10, and a third flow tube 110c formed from the groove 10 to the drain tube 120.

The water introduced into the first flow tube 110a may flow along the first flow tube 110a to be introduced into the drain tube 120 and then flow along the drain tube 120 to be discharged to the groove 10. The water introduced into the second flow tube 110b may flow along the second flow tube 110b and then be discharged to the groove 10. The water introduced into the third flow tube 110c may flow along the third flow tube 110c to be introduced into the drain tube 120 and then flow along the drain tube 120 to be discharged to the groove 10.

Since a pressure is provided at the inlet of the kerf 100 during the running of the tire, a pressure is provided at the inlet port 112 of the flow tube so that the speed of the discharged water can be further increased. In addition, since the volume of the flow tube 110 or the drain tube 120 is changed due to the deformation of the kerf 100 during the running of the tire, the water drainage performance from the flow tube 110 or the drain tube 120 can be increased by pumping action while the pressure in the flow tube 110 or the drain tube 120 is changed.

Figure 3:
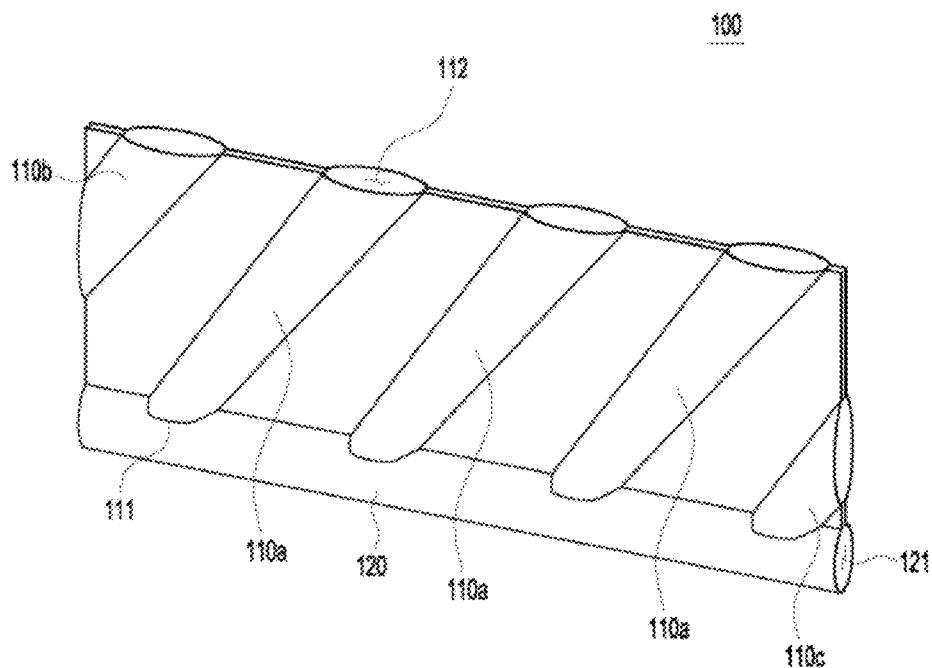
FIG. 3 is a schematic view illustrating a kerf in which the cross-sectional area of a flow tube is changed according to the embodiment of the present invention.
Figure 4:
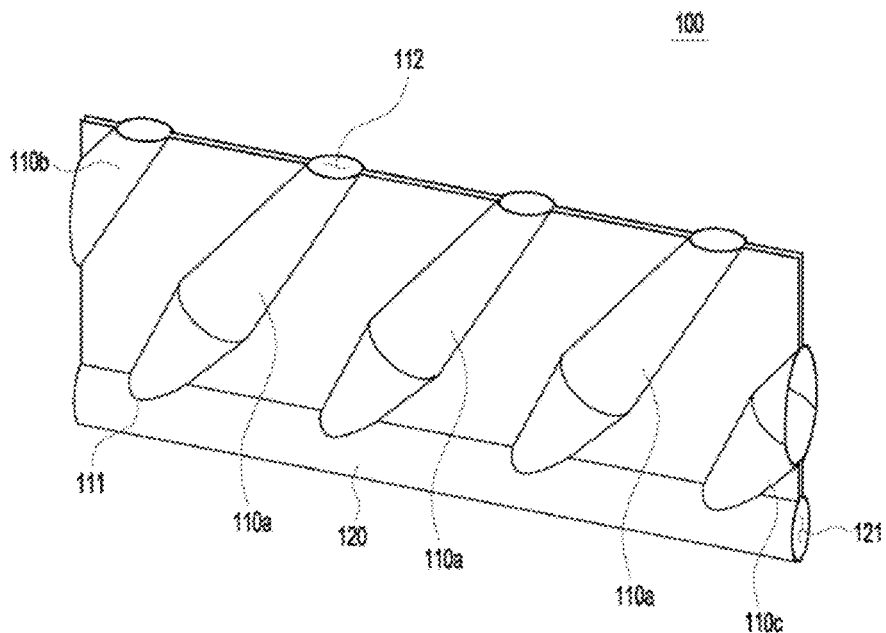
FIG. 4 is a schematic view illustrating a kerf in which the cross-sectional area of a flow tube increases according to the embodiment of the present invention.

FIG. 3 is a schematic view illustrating a kerf 100 in which the cross-sectional area of a flow tube 110 is changed according to the embodiment of the present invention. FIG. 4 is a schematic view illustrating a kerf 100 in which the cross-sectional area of a flow tube 110 increases according to the embodiment of the present invention.

As illustrated in FIG. 3, the cross-sectional area of the flow tube 110 may gradually decrease toward the drain tube 120 from the inlet of the kerf 100.

When the cross-sectional area of the flow tube 110 decreases as it gets close to the drain tube 120, the outlet port 111 of the flow tube, through which water is discharged from the flow tube 110, has a smaller area than the inlet port 112 of the flow tube located at the inlet of the kerf 100, and the speed of water discharged from the outlet port 111 of the flow tube is increased by Bernoulli's principle. Thus, the discharge efficiency of water can be increased compared to when the area of the inlet port 112 of the flow tube is equal to that of the outlet port 111 of the flow tube.

This will be described later in detail with reference to FIG. 6.

As illustrated in FIG. 4, the cross-sectional area of the flow tube 110 may gradually increase toward the drain tube 120 from the inlet of the kerf 100 and then gradually decrease again.

If the area of the inlet port 112 of the flow tube is larger than that of the outlet port 111 of the flow tube as described above, the strength at the inlet of the kerf 100 may be reduced. Therefore, by increasing the cross-sectional area of the flow tube 110 from the inlet port 112 of the flow tube to a portion of the flow tube 110 and then decreasing the cross-sectional area of the flow tube 100 from the portion of the flow tube 100 to the outlet port 111 of the flow tube, it is possible to prevent a reduction in strength at the inlet of the kerf 100 and simultaneously to allow the speed of water discharged from the flow tube 110 to be greater than the speed of water introduced into the flow tube 100.

The flow tube 110 may have a cross-sectional diameter of 1 to 4 mm.

Here, the flow tube 110 may have a circular or elliptical cross-section. When the flow tube 110 has the elliptical cross-section, the cross-sectional diameter of the flow tube 110 may mean the shortest diameter.

If the cross-sectional diameter of the inlet port 112 of the flow tube is less than 1 mm, an amount of water introduced into the inlet port 112 of the flow tube may be significantly reduced. If the cross-sectional diameter of the inlet port 112 of the flow tube is more than 4 mm, the strength of the kerf 100 may be deteriorated due to a reduction in surface area of the kerf 100.

If the cross-sectional diameter of the outlet port 111 of the flow tube is less than 1 mm, an amount of water discharged from the outlet port 111 of the flow tube may be significantly reduced. If the cross-sectional diameter of the outlet port 111 of the flow tube is more than 4 mm, the strength at the connection portion between the outlet port 111 of the flow tube and the drain tube 120 may be deteriorated or the strength of the kerf 100 may be deteriorated due to an increase in size of the outlet port 111 of the flow tube exposed toward the groove.

If the internal cross-sectional diameter of the flow tube 110 is less than 1 mm, an amount of water flowing in the flow tube 110 may be significantly reduced. If the internal cross-sectional diameter of the flow tube 110 is more than 1 mm, the strength of the kerf 100 may be deteriorated due to an increase in space within the kerf 100.

Figure 5:
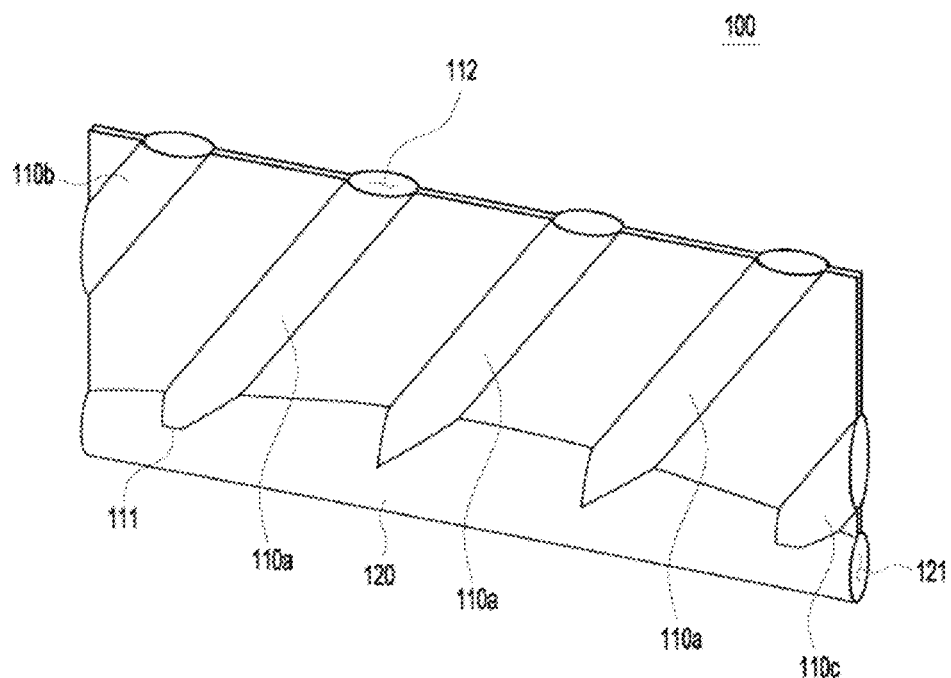
FIG. 5 is a schematic view illustrating a kerf in which the cross-sectional area of a drain tube is changed according to the embodiment of the present invention.

FIG. 5 is a schematic view illustrating a kerf 100 in which the cross-sectional area of a drain tube 120 is changed according to the embodiment of the present invention.

As illustrated in FIG. 5, the cross-sectional area of the drain tube 120 may increase toward the outlet port 121 of the drain tube from the center of the drain tube 120.

When the cross-sectional area of the drain tube 120 decreases as it gets close to the groove 10 from the center of the drain tube 120, the outlet port 121 of the drain tube has a smaller area than the cross-section at the center of the drain tube 120, and the speed of water discharged from the outlet port 121 of the drain tube is increased by Bernoulli's principle. Thus, the discharge efficiency of water can be increased compared to when the area of the center of the drain tube 120 is equal to that of the outlet port 121 of the drain tube.

This will be described later in detail with reference to FIG. 6.

The drain tube 120 may have a cross-sectional diameter of 0.5 to 3 mm.

Here, the drain tube 120 may have a circular or elliptical cross-section. When the drain tube 120 has the elliptical cross-section, the cross-sectional diameter of the drain tube 120 may mean the shortest diameter.

If the cross-sectional diameter of the drain tube 120 is less than 0.5 mm, an amount of water discharged from the outlet port 121 of the drain tube may be significantly reduced. If the cross-sectional diameter of the drain tube 120 is more than 3 mm, the strength of the kerf 100 may be deteriorated due to an increase in space within the kerf 100.

Figure 6:
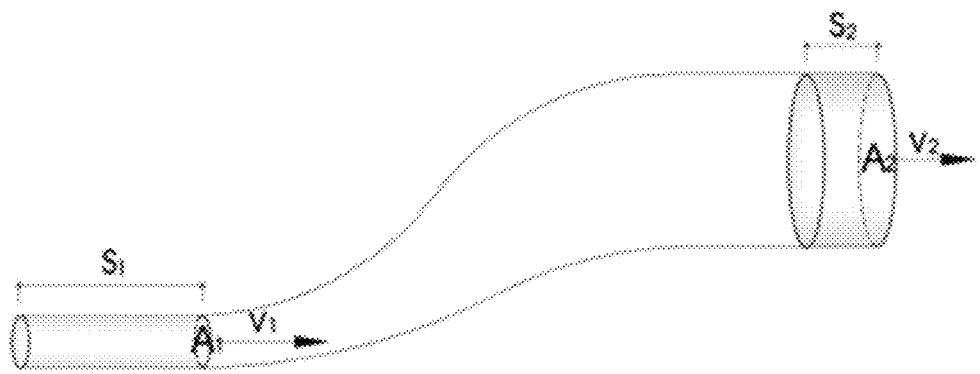
FIG. 6 is an image for explaining Bernoulli's principle applied to the present invention.

FIG. 6 is an image for explaining Bernoulli's principle applied to the present invention.

Water may be assumed to be an ideal fluid since it has an incompressible nature at room temperature and atmospheric pressure. Thus, the following Equation 1 may be applied to the water flowing in the flow tube 110 or the drain tube 120.

$$P_1 + \tfrac{1}{2}\rho v_1^2 + \rho g h_1 = P_2 + \tfrac{1}{2}\rho v_2^2 + \rho g h_2 \qquad \text{[Equation 1]}$$

The height parameter h may be excluded due to the rotation of the tire. As a result, the following Equation 2 may be applied to the water flowing in the flow tube 110 or the drain tube 120.

$$P_1 + \tfrac{1}{2}v_1^2 = P_2 + \tfrac{1}{2}v_2^2 \qquad \text{[Equation 2]}$$

As illustrated in FIG. 6, since the volume of water $V_1$ introduced into the tube per unit time is equal to the volume of water $V_2$ discharged from the tube per unit time, $S_1 \times A_1 = S_2 \times A_2$. Therefore, $S_1 \times V_1 = S_2 \times V_2$ can be induced from $S_1 = V_1 \times t$ and $S_2 = V_2 \times t$.

Accordingly, it can be seen that the speed of water is doubled when the area is reduced by 50%. Using this principle, it can be seen that when the cross-sectional area of the flow tube 110 decreases as it gets close to the drain tube 120, the speed of water discharged from the outlet port 111 of the flow tube is increased so that the discharge efficiency of water is increased compared to when the area of the inlet port 112 of the flow tube is equal to that of the outlet port 111 of the flow tube.

In addition, it can be seen that when the cross-sectional area of the drain tube 120 decreases as it gets close to the groove 10 from the center of the drain tube 120, the speed of water discharged from the outlet port 121 of the drain tube is increased so that the discharge efficiency of water is increased compared to when the area of the center of the drain tube 120 is equal to that of the outlet port 121 of the drain tube.

The present invention with the above-mentioned configuration has an effect of efficiently discharging water, which is additionally absorbed through a plurality of flow tubes, through the flow tubes and the drain tube, thereby improving wet grip performance.

The present invention is not limited to the above effect, and it should be understood that the present invention includes all effects which can be inferred from the detailed description of the present invention or the configuration of the invention defined by the appended claims.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

What is claimed is:

1. A tire with enhanced wet grip, in which a block and a groove are formed on a tread, the tire comprising:
    a kerf formed in the block to discharge water introduced thereinto to the groove;
    a drain tube formed in the kerf in a longitudinal direction thereof and connected to the groove to discharge the water to the groove; and
    a plurality of flow tubes formed in the kerf, each of the plurality of flow tubes extending toward the drain tube from an inlet of the kerf, into which the water is introduced, and connected to the groove or the drain tube, wherein the plurality of flow tubes are arranged in parallel to each other and inclined with respect to the drain tube,
    wherein each of the plurality of flow tubes has an elliptical cross-section at the inlet of the kerf,
    wherein the shortest diameter of the elliptical cross-section is larger than a width of the kerf at the inlet thereof and the longest diameter of the elliptical cross-section is arranged along the inlet of the kerf to be in parallel with the longitudinal direction of the drain tube, and
    wherein the drain tube has a cross-sectional area that gradually decreases toward an outlet port of the drain tube from a center of the drain tube, such that a speed of the water discharged from the outlet port of the drain tube is increased.

2. The tire according to claim 1, wherein the drain tube is formed between a lower end of the kerf and a half point of a depth of the kerf.

3. The tire according to claim 1, wherein each of the plurality of flow tubes has a cross-sectional area that gradually decreases toward the drain tube from the inlet of the kerf.

4. The tire according to claim 1, wherein each of the plurality of flow tubes has a cross-sectional area that gradually increases toward the drain tube from the inlet of the kerf and then gradually decreases again.

5. The tire according to claim 1, wherein each of the plurality of flow tubes has a cross-sectional diameter of 1 to 4 mm.

6. The tire according to claim 1, wherein the drain tube has a cross-sectional diameter of 0.5 to 3 mm.

* * * * *